(12) United States Patent
Goerlitz et al.

(10) Patent No.: US 8,703,283 B2
(45) Date of Patent: Apr. 22, 2014

(54) POLYMER BLENDS FOR PRODUCING FILMS WITH A REDUCED NUMBER OF DEFECTS

(75) Inventors: Wolfram Goerlitz, Wiesbaden (DE); Anne-Meike Schauwienold, Hofheim (DE)

(73) Assignee: Topas Advanced Polymers GmbH, Frankfurt (DE)

( * ) Notice: Subject to any disclaimer, the term of this patent is extended or adjusted under 35 U.S.C. 154(b) by 1531 days.

(21) Appl. No.: 11/665,551

(22) PCT Filed: Oct. 13, 2005

(86) PCT No.: PCT/EP2005/010981
§ 371 (c)(1),
(2), (4) Date: Apr. 27, 2007

(87) PCT Pub. No.: WO2006/042681
PCT Pub. Date: Apr. 27, 2006

(65) Prior Publication Data
US 2009/0020898 A1    Jan. 22, 2009

(30) Foreign Application Priority Data
Oct. 18, 2004 (DE) .......................... 10 2004 050 659

(51) Int. Cl.
*B32B 27/32*    (2006.01)

(52) U.S. Cl.
USPC .......... 428/220; 428/213; 428/35.5; 428/178; 428/515; 428/516; 525/210; 525/211; 525/286; 525/290; 525/932

(58) Field of Classification Search
USPC ........ 428/515, 213, 35.7, 480, 342, 516, 220, 428/483, 35.9, 178; 156/82, 150; 525/210, 525/211, 289, 290, 932
See application file for complete search history.

(56) References Cited

U.S. PATENT DOCUMENTS

| | | | | |
|---|---|---|---|---|
| 5,328,565 A | | 7/1994 | Rasch et al. ................... 162/113 |
| 5,439,973 A | | 8/1995 | Yamamoto et al. ............. 525/66 |
| 5,532,030 A | * | 7/1996 | Hirose et al. ................. 428/35.7 |
| 5,648,443 A | * | 7/1997 | Okamoto et al. ............. 526/281 |
| 5,656,134 A | | 8/1997 | Marinack et al. ............. 162/281 |
| 5,883,192 A | * | 3/1999 | Natori et al. ..................... 525/98 |
| 6,225,407 B1 | | 5/2001 | Jacobs et al. ..................... 525/70 |
| 2003/0224130 A1 | * | 12/2003 | Goerlitz et al. ............. 428/34.2 |
| 2004/0139697 A1 | * | 7/2004 | Reddy et al. ..................... 53/412 |
| 2005/0112337 A1 | * | 5/2005 | Jester ............................ 428/200 |

FOREIGN PATENT DOCUMENTS

| | | | | |
|---|---|---|---|---|
| CA | 2009093 | 8/1990 | ............. C08L 23/00 |
| CA | 2094558 | 10/1993 | ............. C08L 53/00 |
| CA | 2279536 | 10/1998 | ............. C08L 23/16 |
| CN | 1192455 A | 9/1998 | ............. B29C 47/04 |
| DE | 42 13 219 A1 | 10/1993 | ............. C08L 53/00 |
| EP | 0 384 694 | 8/1990 | ............. C08G 61/02 |
| EP | 0 806 520 A | 11/1997 | ............. D21F 11/00 |
| EP | 0 965 614 A1 | 12/1999 | ............. C08L 45/00 |
| JP | 05-051501 | 3/1993 | ............. C08L 23/18 |
| JP | 08-072210 | 3/1996 | ............. B32B 27/32 |
| JP | 08-239482 | 9/1996 | ................ C08J 3/12 |
| JP | 2000159946 | 6/2000 | ............. C08L 23/02 |
| JP | 2001026692 | 1/2001 | ............. C08L 45/00 |
| JP | 2001219503 | 8/2001 | ............. B32B 27/00 |
| JP | 2003139950 | 5/2003 | ................ G02B 5/30 |
| JP | 2003266601 | 9/2003 | ............. B32B 27/00 |
| JP | 2001310952 | 11/2006 | .................. C08J 5/18 |
| WO | WO 96/18771 | 6/1996 | ............. D21H 27/40 |
| WO | WO 03/095200 A1 | 11/2003 | ............. B32B 27/32 |
| WO | WO 2004/024433 A2 | 3/2004 | |

OTHER PUBLICATIONS

International Search Report.
Office Action from Chinese Patent Office dated Jan. 6, 2009.
Randy D. Jester, "Heat Seal Characteristics of CyclicOlefin Copolymer/Polyethylene Blends", TAPPI Place Confe rence 2002, Ticona LLC, 2002.
Canadian Official Action dated Sep. 1, 2011.

* cited by examiner

*Primary Examiner* — Gwendolyn Blackwell
*Assistant Examiner* — Ruiyun Zhang
(74) *Attorney, Agent, or Firm* — Michael W. Ferrell

(57) ABSTRACT

The invention relates to selected polymer blends which can be used for production of films or sheets having reduced defects, and also to a process for preparation of the polymer blends.

10 Claims, No Drawings

POLYMER BLENDS FOR PRODUCING FILMS WITH A REDUCED NUMBER OF DEFECTS

CLAIM FOR PRIORITY

This application is based upon German Patent Application No. DE 10 2004 050 659.0, entitled, "Polymerblends zur Herstellung von Folien mit reduzierter Defektzahl", filed Oct. 18, 2004. The priority of German Patent Application No. DE 10 2004 050 659.0 is hereby claimed and its disclosure incorporated herein by reference.

TECHNICAL FIELD

The invention relates to selected polymer blends which can be used for production of foils (films, sheets, and the like) with reduced defects, and also to a process for preparation of the polymer blends. The polymer blends of the invention include a cycloolefin component and a polyethylene component.

BACKGROUND

Foils and moldings composed of cycloolefin copolymers (COC) exhibit low density, high transparency, low birefringence, extremely low water absorption and high stiffness, strength and hardness.

Processing of COC on conventional industrial extrusion plants to make foils or films, e.g. on grooved- or smooth-barrel extruders, often leads to an increased number of defects in the foil, such as gelling or fish eyes. The increased defect numbers restrict the usefulness of the material for certain industrial applications. Other polymers which may be processed into foils with lower occurrence of defects, do not however, have the excellent properties of the cycloolefin copolymers, in particular high stiffness. There is therefore a need for foils, or moldings, with minimum defects, which generally have the properties of the cycloolefin copolymers. For the purposes of this application, the term foil also means film or sheet.

EP 384 694 A describes the production of films composed of blends of COC and of other polymers, e.g. of polyolefins. The films thus obtained generally have good surface properties, but there is no further description of the individual properties. Nor does the document give any indication of the reduction in the defect numbers during production of films.

It was an object of the present invention to provide polymers which permit production of foils or moldings with reduced occurrence of defects.

SUMMARY OF INVENTION

The object of the invention is achieved via provision of the inventive polymer blend. It has been found that addition of selected amounts of polyethylene (PE) can markedly improve the processibility of cycloolefin copolymers. A further marked improvement results from the manner of preparation of the polymer blends.

The polymer blends have hitherto been prepared by way of example via mixing of COC granules and PE granules in what is known as the "salt and pepper" method. However, the foils produced from blends prepared in this manner have high defect numbers.

It has now been found according to one aspect of the invention that melt-compounding of polyethylene and cycloolefin copolymers or mixing of PE solutions and COC solutions can prepare the inventive polymer blends with an additional improvement in defect numbers.

DETAILED DESCRIPTION

The present invention is described in detail below with reference to the various examples. Modifications to particular examples within the spirit and scope of the present invention, set forth in the appended claims, will be readily apparent to those of skill in the art.

Unless otherwise indicated, terms are to be construed in accordance with their ordinary meaning. Percent, for example, refers to weight percent, unless context indicates otherwise.

The invention provides a polymer blend comprising COC and from 1 to 10% by weight of PE—based on the weight of the polymer blend.

Cycloolefin Copolymer (COC)

The inventive polymer blends comprise COC which generally contains, based on the total weight of the cycloolefin copolymer, from 0.1 to 100.0% by weight, preferably from 0.1 to 99.9% by weight, of polymerized units which are derived from at least one polycyclic olefin of the following formulas I, II, II', III, IV, V or VI, shown below:

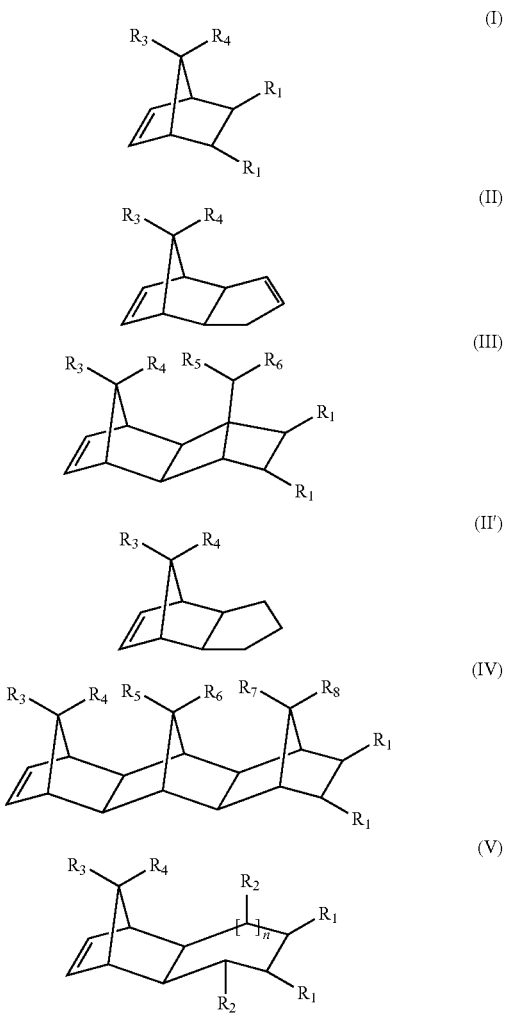

-continued

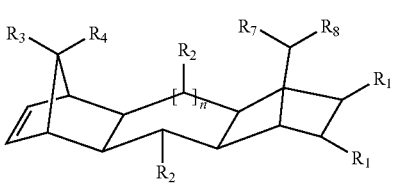
(VI)

in which $R^1$, $R^2$, $R^3$, $R^4$, $R^5$, $R^6$, $R^7$ and $R^8$ are identical or different and are a hydrogen atom or a $C_1$-$C_{20}$-hydrocarbon radical, such as a linear or branched $C_1$-$C_8$-alkyl radical, $C_6$-$C_{18}$-aryl radical, $C_7$-$C_{20}$-alkylenearyl radical, or a cyclic or acyclic $C_2$-$C_{20}$-alkenyl radical, or form a saturated, unsaturated or aromatic ring, where identical radicals $R^1$ to $R^8$ in the various formulas I to VI can have a different meaning, and in which n can assume values from 0 to 5, and from 0 to 99.9% by weight, preferably from 0.1 to 99.9% by weight, in particular from 0.5 to 80% by weight, based on the total weight of the cycloolefin copolymer, of polymerized units which derive from one or more acyclic olefins of the formula VII

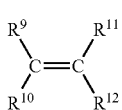
(VII)

in which $R^9$, $R^{10}$, $R^{11}$ and $R^{12}$ are identical or different and are a hydrogen atom or a linear, branched, saturated or unsaturated $C_1$-$C_{20}$-hydrocarbon radical, such as a $C_1$-$C_8$-alkyl radical or a $C_6$-$C_{18}$-aryl radical.

In one preferred embodiment, the cycloolefin copolymers used can contain from 0 to 45% by weight, preferably from 0.1 to 40% by weight, based on the total weight of the cycloolefin copolymer, of polymerized units which derive from one or more monocyclic olefins of the formula VIII

(VIII)

in which m is a number from 2 to 10.

The cycloolefin units may also include derivatives of the cyclic olefins such as those having polar groups, for example, halogen, hydroxy, ester, alkoxy, carboxy, cyano, amido, imido or silyl groups.

For the purposes of the invention, preference is given to COCs which contain polymerized units which are derived from polycyclic olefins of the formula I or III, and polymerized units which are derived from acyclic olefins of the formula VII. Particularly preferred are polycyclic olefins having underlying norbornene structure, e.g. norbornene and tetracyclododecene and, if appropriate, vinylnorbornene or norbornadiene.

Preference is also given to cycloolefin copolymers having polymerized units derived from acyclic olefins having terminal double bonds, e.g. α-olefins having from 2 to 20 carbon atoms, in particular ethylene or propylene. Suitable COC resins in these embodiments include, for example, ethylene-norbornene copolymers and ethylene-tetracyclododecene copolymers.

Preferred terpolymers may include ethylene-norbornene-vinylnorbornene terpolymers, ethylene-norbornene-norbornadiene terpolymers, ethylene-tetracyclododecene-vinylnorbornene terpolymers, ethylene-tetracyclododecene-vinyltetracyclododecene terpolymers or ethylene-norbornene-dicyclopentadiene terpolymers.

A particularly preferred COC for use in the invention is a copolymer composed of ethylene and norbornene.

Processes for preparation of the cycloolefin copolymer component is described briefly following. The cycloolefin copolymers can be prepared in a known manner at temperatures of from −78 to 200° C. and at a pressure of from 0.01 to 200 bar, in the presence of one or more catalyst systems in which at least one transition metal compound and, if appropriate, a cocatalyst and a support material are present. Suitable transition metal compounds are metallocenes, in particular stereorigid metallocenes. Examples of catalyst systems suitable for preparation of the COCs are described by way of example in U.S. Pat. No. 5,008,356, EP-A-0 407 870, EP-A-0 485 893 and EP-A-0 503 422.

Other routes briefly outlined below can also be used to prepare the cycloolefin copolymers: catalyst systems based on mixed catalysts composed of titanium salts and of organylaluminum compounds are described in DD-A-109 224 and DD-A-237 070. EP-A-0 156 464 describes preparation using vanadium-based catalysts.

The cycloolefin copolymers can also be obtained via ring-opening polymerization of at least one of the monomers having the formulas I to VI and subsequent hydrogenation of the products obtained.

The polymerization can also take place in a plurality of stages, and block copolymers can also be produced. See, for example, DE-A-42 05 416.

The heat resistance of the cycloolefin copolymers can be adjusted widely. For cycloolefin copolymers, the glass transition temperature $T_g$, is measured according to DIN EN ISO 11357-1 with the aid of DSC equipment with a heating rate of 20 K/min can be used as a guide to the heat resistance which can be determined according to ISO 75 Part 1 and Part 2 of injection moldings. The glass transition temperatures of the cycloolefin copolymers may be in a suitable range of from 25 to 200° C., preferably from 60 to 190° C., in particular from 65 to 145° C. The inventive polymer blends can also, if appropriate, comprise mixtures of various COCs with various glass transition temperatures.

The density of the cycloolefin copolymers used in the present invention is usually in the range of from 0.9 to 1.1 g/cm³, preferably from 0.9 to 1.05 g/cm³.

The viscosity numbers VN (measured according to DIN 53 728) of the cycloolefin copolymers may be in the range from 5 to 5000 ml/g, preferably from to 2000 ml/g and in particular from 5 to 1000 ml/g.

Polyethylene (PE)

As noted above, the inventive polymer formulations include a polyethylene component in addition to the COC resin. Polyethylene is a semicrystalline thermoplastic whose properties depend to a major extent on the polymerization process (Saechtling, Kunststoff-Taschenbuch [Plastics handbook], 27th edition).

LDPE is prepared at high pressure with free-radical initiation, giving highly branched PE having internally branched side chains of varying length. Densities of LDPE are usually from 0.915 to 0.935 g/cm³.

HDPE is prepared at low (Ziegler catalysts) or moderate (Phillips catalysts) pressures, using metal complex catalysts. This gives mainly linear polyethylene having only very little branching; 5 short branches are a typical value. The result of this is high crystallinity and high density which are usually from 0.942 to 0.965 g/cm³.

LLDPE is prepared at low pressures via copolymerization of ethene with α-olefins via metal complex catalysts. The α-olefins included in the polymerization form short side chains which lower crystallinity and therefore lower density. As a function of the α-olefin used and its content in the LLDPE, the density of LLDPE can be adjusted between that of HDPE and very low densities of 0.865 g/cm$^3$. Polyethylenes with very low densities are also termed VLDPE (very low density) or ULDPE (ultra low density).

Metallocene metal complex catalysts can be used to prepare LLDPEs with particular properties, e.g. high toughness and puncture resistance. Polyethylenes which are prepared with metallocene catalysts are termed "mLLDPEs". The variability of the density range of mLLDPEs is similar to that of the density range of LLDPE, and grades with extremely low densities are also termed plastomers.

In the case of all of the types of polyethylene, there are commercial grades with very different flowabilities. Molecular weight can be lowered via control of the chain-termination reaction to such an extent that the product comprises waxes. HDPE grades with very high molecular weights are termed HMWPE and UHMWPE.

In one preferred embodiment of the invention, the polymer blends comprise COC and, as polyethylene, LLDPE, preferably mLLDPE. It is preferable to use LLDPE, in particular mLLDPE, whose density is from 0.905 to 0.930 g/cm$^3$.

The inventive polymer blends preferably comprise from 2 to 8% by weight of polyethylene, in particular from 2.5 to 5% by weight of polyethylene, based on the weight of the polymer blend.

Further preference is given to polymer blends which are prepared via mixing in solution or via melt-compounding where the individual components are melted and then blended together as described in further detail below.

Preference is likewise given to polymer blends which are prepared via mixing of COC and mLLDPE in solution.

Process for Preparation of Polymer Blends

The invention further provides a process for preparing the inventive polymer blends, where the polymer blends are prepared via melt-compounding or via mixing in solution.

Particular preference is given here to preparation via melt-compounding.

A further particularly preferred embodiment claims preparation of the inventive polymer blends via mixing in solution.

However, unless otherwise specified, the polymer blends can generally be prepared by any suitable methods known in the art including those described below.

Salt and Pepper Blends

The blends may be prepared by "salt and pepper" techniques via simple mixing of granules.

Melt-Compounding

It has been discovered that finer mixing of the phases of immiscible blends is achieved if the individual components are melted and mixed. This type of blend is called a melt-compounded material. Twin-screw extruders are typically used for the compounding process, but kneaders can also be used.

The polyethylene can preferably be added directly within the production plant during the process of preparing the COC (internal melt-compounding). Here, the PE is added to the COC melt which remains after the reaction solvent has been drawn off. By way of example, the PE is added via a subsidiary extruder or a co-kneader, in which the polyethylene is melted. A melt pump can be used to meter the material into the COC melt stream. Mixing elements such as static mixers can be used for mixing of the melts.

The polymer blends are then subsequently granulated by conventional means, e.g. via strand pelletization, underwater ring pelletization, die-face pelletization or droplet pelletization.

Mixing in Solution

Polymer blends can moreover be prepared via dissolution of the individual blend components in solvent, mixing of the solutions and removal of the solvent. Removal of the solvent here can be achieved via solvent evaporation, for example at an elevated temperature and/or reduced pressure.

As an alternative, the solvent can be removed via introduction of the blend solution into a precipitant and filtration of the precipitated polymer blend. The precipitated material can then be subjected to a pelletizing step or used directly as powder.

In another, preferred embodiment, the PE solution can be added during the COC preparation process—and this means that the mixing in solution takes place directly in the production plant (internal mixing in solution). The PE solution can be added directly into the polymerization reactor, but preferably after conclusion of the copolymerization reaction, prior to removal of the solvent.

To this end, the PE can be dissolved in a stirred tank under suitable conditions and added by way of a pump to the COC solution. The mixing of the two solutions can take place in a stirred vessel or in pipelines through which material flows. The solvent is then removed via solvent evaporation, for example at an elevated temperature and/or reduced pressure. The melt is then cast to give a strand and pelletized conventionally, e.g. via strand pelletization, underwater ring pelletization, die-face pelletization or droplet pelletization.

Examples of suitable solvents for preparation of the PE solution are high-boiling aliphatics, but other solvents can also be used. The polyethylene solution is prepared at from 50 to 200° C., preferably from 90 to 200° C. The concentration of the polyethylene solution is from 1 to 25%, preferably from 5 to 25%, particularly preferably from 10 to 20%. The purity of the solutions can be increased via use of suitable filters.

Irrespective of whether the blend has been prepared in the inventive process in solution or in the melt, the purity of the melt can be increased via melt filtration, e.g. by way of depth filters.

Spray Coating

A further embodiment of the invention is a process for preparation of the polymer blends where the polymer blend granules or pellets are coated with a wax layer via spray coating.

The predried pellets or granules are dropped into a collection vessel and in this process are sprayed with a wax dispersion emerging from nozzles. The nozzles here have an annular arrangement, so that contact with the stream of pellets or of granules is uniform. Drying then takes place in a stream of dry air, thus achieving residual moisture levels below 200 ppm. The spraying process uses twin-fluid nozzles, with air.

The wax dispersion is composed of solid wax particles (e.g. ethylenebis-stearamide or pentaerythritol tetrastearate) with average diameter below 30 μm, stabilized in an aqueous matrix via addition of surfactants. The content of solid wax particles in the dispersion is from 5 to 50%, preferably from 10 to 40%. The wax content on the pellets or granules is from 200 to 3000 ppm, preferably from 1000 to 1500 ppm. The wax is preferably selected from the group formed by ethylenebisstearamide and pentaerythritol tetrastearate.

The spray coating process gives the pellets or granules a wax coating which is uniform and has good adhesion and is advantageous for storage, transport and further processing.

Foils

The inventive polymer blends can be used for production of mono- or multilayer foils.

The invention further provides, therefore, mono- or multilayer foils which comprise the inventive polymer blends.

Use of the inventive polymer blends during production of foils can reduce the occurrence of defects, i.e. the defect number, by at least 70%, preferably at least 80%, in particular at least 90%. The percentage improvement is based on comparing the defect number measurements on foils composed of COC without PE (e.g. Comparative example 1) and foils produced from the inventive polymer blends.

The thickness of the foils as claimed in the invention is generally in the range from 5 to 1000 µm, preferably from 10 to 600 µm, particularly preferably from 15 to 300 µm. These can take the form of monofoil or of multilayer foil.

The foils can be combined to give composite multilayer foils. The composite can be produced via lamination of films each of which have been previously produced individually, or can be produced via coextrusion or via extrusion coating or extrusion lamination.

There can also be further adhesion-improving layers provided between the individual layers. The substances used for this purpose can comprise at least one or more polymers and are well known per se. The cut foil arising during the manufacturing process, with all of its components, can also be used as an adhesive layer and thus recycled. This can markedly improve the cost-effectiveness of the inventive foil and reduce damage to the environment.

The adhesion-improving layer can advantageously be applied in the melt or else as solution, suspension or solvent-containing adhesive.

The invention further provides a process for production of a foil, wherein the polymer blend is compressed and heated in an extruder, then the melt is extruded through a flat-film die or annular die and, if appropriate, quenched on a chill roll, and the resultant foil is drawn off on one or more rolls or rollers.

In one preferred embodiment, the invention provides a process for production of a multilayer foil via coextrusion, via extrusion coating or via extrusion lamination.

The foils as claimed in the invention can by way of example be produced via a known process for production of mono- or multilayer plastics foils, where the polymer blends are compressed and heated in an extruder and then the melt or the melts are extruded through a flat-film die and the resultant foil is drawn off on one or more rolls.

If appropriate, the additives can be added previously to the polymer or polymer blend, or can be added via masterbatch technology.

The melt(s) can also be extruded via an annular die, whereupon the resultant foil is processed in a blown-film plant to give the foil and is collapsed by way of rolls.

Extrusion experiments using the inventive polymer blends have also shown that the specified temperatures in the barrel and dies can be reduced from 230° C. to 210° C. This produces less thermal stress during production of extruded foils. This method also permits a reduction in the defect numbers of the foils, while at the same time increasing the transparency.

One or both surface(s) of the foil can, if appropriate, be corona- or flame-treated by known methods. Treatment of the surface prepares this for subsequent inscription or printing by well-known methods.

However, the inventive polymer blends can also be used for production of moldings by means of extrusion blow molding processes or injection blow molding processes. Here again, the use of the inventive polymer blends reduces the number of defects (defect numbers) on the molding, thus permitting use of the moldings in applications where excellent optical properties are important. By way of example, production of prefillable syringes and ampoules in the medical sector thus becomes practical.

In the extrusion blow molding process, a blowable preform is produced via extrusion in a first stage. In a second stage, blow molding takes place, with subsequent cooling of the molding.

In contrast to the extrusion blow molding process, the injection blow molding process injection-molds a preform. The second stage in turn encompasses the blow molding and cooling of the molding in the blow mold.

The invention further provides the use of the inventive polymer blends for production of foils.

The inventive foils feature substantially reduced defect numbers, which are markedly reduced via use of the inventive polymer blends, by at least 70%, preferably at least 80%, and in particular at least 90%, as compared to a a like film made from a like COC but having no PE component.

The low defect numbers of the inventive foils open up a wide variety of possible applications, such as twist-wrap foils (e.g. confectionary wraps), sleeves (shrink packaging), blister packaging, sausage casings and blown foils. However, it is also possible to produce retardation films or polarization films for optical applications, e.g. for flat display screens.

One preferred embodiment therefore claims the use of the inventive polymer blend for production of twist-wrap foils.

The twist-wrap foils are preferably composed of an outer layer, produced from the inventive polymer blend, and a core composed of LLDPE, preferably mLLDPE.

The total thickness of the twist-wrap foils is from 20 to 50 µm, preferably from 25 to 35 µm.

Further preference is given to the use of the inventive polymer blends for production of retardation films and of polarization films.

The use of the inventive polymer blends is likewise preferred for production of moldings by means of extrusion blow molding processes or of injection blow molding processes.

The following examples are presented to further illustrate and explain the present invention and should not be taken as limiting in any regard.

EXAMPLES

Melt-Compounding

The polymer blends of Comparative examples C2 to C6 and of the Inventive examples 7 to 9 were prepared from Topas 8007® and from the additional polymer indicated below in a Leistritz LSM 34 L/D 30 twin-screw extruder at 230° C. barrel temperature and 100 rpm screw rotation rate with throughput of 10 kg/h. The extrudate was cooled in a water bath and chopped by a Primo 60E pelletizer from Rieter.

Mixing in Solution

For the blends of Inventive examples 10 to 13 and Comparative examples C14 and C15, norbornene and ethylene were used to prepare, in a stirred tank, a 10% strength decalin solution of a cycloolefin copolymer (e.g. Topas 8007®) whose glass transition temperature was 80° C. (DSC 20 K/min, second heating cycle) and whose MVI (260° C., 2.16 kg) was 32 ml/10 min. For the blends of Inventive examples 19 to 22, norbornene and ethylene were used, in a stirred tank, to prepare a 10% strength decalin solution of a cycloolefin copolymer (e.g. Topas 9506®) whose glass transition temperature was 65° C. (DSC 20 K/min, second heating cycle) and whose MVI (260° C., 2.16 kg) was 20 ml/10 min. In a further stirred tank, a solution of the respective added polymer of strength about 3% in decalin is prepared. 100 kg of the COC solution and the necessary amount of the polymer solution for the composition stated in table 1 are mixed and the solvent is removed in vacuum at an elevated temperature.

| | |
|---|---|
| Inventive example 10: | 8.33 kg of a 3.2% strength solution of Exceed 1018 CA |
| Inventive example 11: | 8.33 kg of a 2.7% strength solution of Dowlex NG 5066 E |
| Inventive example 12: | 16.66 kg of a 3.0% strength solution of Dowlex NG 5066 E |
| Inventive example 13: | 33.3 kg of a 3.3% strength solution of Dowlex NG 5066 E |
| Comparative example C14: | 2 kg of a 2.8% strength solution of Dowlex NG 5066 E |
| Comparative example C15: | 8.33 kg of a 3.1% strength solution of Hybrar 7125 |
| Inventive example 19: | 21.9 kg of a 3% strength solution of Exceed 1018 CA |
| Inventive example 20: | 21.2 kg of a 3% strength solution of LL1004YB |
| Inventive example 21: | 21.2 kg of a 3% strength solution of Elite 5200G |
| Inventive example 22: | 26.8 kg of a 3% strength solution of Dowlex 3010 |

The polymer melt is cast via a die to give a strand, and pelletized.

Salt and Pepper Blend

A mixture of granules composed of Topas 8007® and Dowlex NG 5066E was prepared for Comparative examples C16 and C17.

Spray Coating

A polymer blend composed of Topas 8007® and Exceed 1018 CA® was prepared as claimed in Inventive example 10. In this instance, a 25% strength wax dispersion was also sprayed onto the granules, comprising ethylenebisstearamide (LUBAprint®) and the material was then dried in a stream of dry air to residual moisture levels below 200 ppm (Inventive example 18).

Production of Foils from Polymer Blends

The blends, and also unmodified Topas 8007®, were processed in a Collin single-screw laboratory extruder (30 mm, L/D 30, 25D three-zone screw with 1:2 compression ratio, and also 2.5D Maddock shear-mixing section and 2.5D faceted mixing section) with T die and chill roll, to give a cast foil of thickness 100 μm. The specified temperatures in the barrel and dies were 230° C., and the chill roll temperature was 80° C. for Inventive examples 1 to 18 and 70° C. for Inventive examples 19 to 22. The screw rotation rate was 40 rpm. A full hopper was used for the extrusion process.

The defect numbers were registered and determined via an FS5 system from Optical Control Systems. The number of defects here is determined by a camera system in combination with suitable software. This permits comparison of defect numbers of different foils.

A foil produced from Topas 8007® without addition of PE was used as standard. The defect numbers registered here were standardized to 100% (Comparative example 1).

Hybrar 7125® (Kuraray): density 0.90 g/cm$^3$ (ISO 1183), melt flow rate MFR (230° C./2.16 kg) 4 g/10 min (ASTM D1238)

Moplen EP 300L® (Basell): density 0.900 g/cm$^3$ (ISO 1183), melt flow rate MFR (230° C./2.16 kg) 6.0 g/10 min (ISO 1133), melt volume rate MVR (230° C./2.16 kg) 8.00 cm$^3$/10 min (ISO 1133)

400R® (Dow Plastics): density 0.925 g/cm$^3$ (ASTM D-792), melt index (190° C./2.16 kg) 1.0 g/10 min (ISO 1133)

Eltex A4009®: density (23° C.) 0.96 g/cm$^3$ (ISO 1183/A), melt flow rate (2.16 kg) 0.9 g/10 min (ISO 1133)

Licowax 190 GR® (Clariant): density (23° C.) 0.95-0.97 g/cm$^3$ (ISO 1183)

Exceed 1018® (Exxon Mobil Chemical): density 0.918 g/cm$^3$ (ASTM D4703/D 4883), melt index 1.0 g/10 min (ASTM D1238)

DOWLEX NG 5066E® (Dow Deutschland GmbH): density 0.87-0.97 g/cm$^3$

DOWLEX 3010® (Dow Plastics): density 0.921 g/cm$^3$ (ASTM D792), melt index 5.4 g/10 min (ASTM D1238)

DOWLEX 2344E® (Dow Plastics): density 0.933 g/cm$^3$ (ISO 1183), melt index 0.7 g/10 min (ISO 1133)

LL1004YB® (Exxon Mobil Chemical): density 0.918 g/cm$^3$ (ASTM D4703/D1505), melt index 2.8 g/10 min (ASTM D1238)

Elite 5200G® (Dow Plastics): density 0.917 g/cm$^3$ (ASTM D792), melt index 4.00 g/10 min (ASTM D1238)

TABLE 1

| | Process for preparing polymer blend | Cycloolefin copolymer ® | Added polymer ® | Type | Proportion of added polymer, % - based on weight of polymer blend | Defect number in % based on C1 |
|---|---|---|---|---|---|---|
| C1 | — | Topas 8007 | — | — | 0 | 100 |
| C2 | melt-compounding | Topas 8007 | Hybrar 7125 | hydrogenated styrene-isoprene block copolymer | 2.5 | 119 |
| C3 | melt-compounding | Topas 8007 | Moplen EP 300L | heterophasic PP copolymer | 2.5 | 102 |
| C4 | melt-compounding | Topas 8007 | Dow 400R | LDPE | 2.5 | 83 |
| C5 | melt-compounding | Topas 8007 | Eltex A4009 | HDPE | 2.5 | 124 |
| C6 | melt-compounding | Topas 8007 | Licowax 190 GR | PE wax | 2.5 | 143 |
| 7 | melt-compounding | Topas 8007 | Exceed 1018 CA | mLLDPE | 2.5 | 3.4 |

TABLE 1-continued

| | Process for preparing polymer blend | Cycloolefin copolymer ® | Added polymer ® | Type | Proportion of added polymer, % - based on weight of polymer blend | Defect number in % based on C1 |
|---|---|---|---|---|---|---|
| 8 | melt-compounding | Topas 8007 | Dowlex NG 5066 E | LLDPE | 2.5 | 4.6 |
| 9 | melt-compounding | Topas 8007 | Dowlex 2344 E | LLDPE | 2.5 | 7.0 |
| 10 | mixing in solution | Topas 8007 | Exceed 1018 CA | mLLDPE | 2.5 | 0.5 |
| 11 | mixing in solution | Topas 8007 | Dowlex NG 5066 E | LLDPE | 2 | 2.6 |
| 12 | mixing in solution | Topas 8007 | Dowlex NG 5066 E | LLDPE | 5 | 0.5 |
| 13 | mixing in solution | Topas 8007 | Dowlex NG 5066 E | LLDPE | 10 | 0.6 |
| C14 | mixing in solution | Topas 8007 | Dowlex NG 5066 E | LLDPE | 0.6 | 29.8 |
| C15 | mixing in solution | Topas 8007 | Hybrar 7125 | hydrogenated styrene-isoprene block copolymer | 2.5 | 19.3 |
| C16 | salt + pepper | Topas 8007 | Dowlex NG 5066 E | LLDPE | 2 | 88 |
| C17 | salt + pepper | Topas 8007 | Exceed 1018 CA | mLLDPE | 2.5 | 22.9 |
| 18 | mixing in solution + spray coating | Topas 8007 | Exceed 1018 CA | mLLDPE | 2.5 | 0.3 |
| 19 | mixing in solution | Topas 9506 | Exceed 1018 CA | mLLDPE | 6 | 0.2 |
| 20 | mixing in solution | Topas 9506 | LL1004YB | LLDPE | 6 | 0.3 |
| 21 | mixing in solution | Topas 9506 | Elite 5200G | mLLDPE | 6 | 0.2 |
| 22 | mixing in solution | Topas 9506 | Dowlex 3010 | LLDPE | 7.5 | 1.4 |

It was found that addition of LLDPE gives a substantial improvement in processing behavior, evidence of which can be seen in the marked reduction in defect numbers of the foils (Inventive examples 7 to 13 and 19 to 22). In the case of polymers such as styrene-diene copolymer (Hybrar 7125, Comparative examples C15 and C2) or else other types of polyethylene, such as LDPE, HDPE, polypropylene copolymer or PE wax, the effect was not very pronounced or was not observed at all (Comparative examples C3 to C6). Equivalent proportion of LLDPE was likewise processed with Topas 8007®, but in the form of granule mixture (salt and pepper mixture). In this case, the effect did not occur or occurred only to a very much lesser extent (Comparative examples C16 and C17). In the case of LLDPE contents outside the inventive range, the effect occurs only to a very much lesser extent (C14).

It was also found that the defect numbers could be again reduced if the polymer blends were prepared via mixing of COC and PE in solution (Inventive examples 10 to 13). The defect number of noninventive polymer blends composed of COC with styrene-diene copolymer was likewise reduced if the polymer blend is prepared via mixing in solution (Comparative example 15). The Inventive examples provide impressive evidence that the defect numbers can then be reduced via the process of preparation of the polymer blends.

It has likewise been found that foils whose defect numbers have again been reduced (Inventive example 18) can be produced from pellets or granules spray-coated with wax dispersions.

In view of the foregoing discussion, relevant knowledge in the art and references discussed above in connection with the Background and Detailed Description, the disclosures of which are all incorporated herein by reference, further description is deemed unnecessary.

The invention claimed is:

1. A film made from a polymer blend comprising cycloolefin copolymer (COC) and from 1 to 10% by weight of linear low density polyethylene (LLDPE) based on the weight of the polymer blend, wherein the polymer blend is prepared via mixing in solution and wherein said film exhibits a reduction in the number of optical defects, as compared by way of an optical measurement system with a film from COC and LLDPE of the same composition blended via melt-compounding, further wherein the cycloolefin copolymer (COC) in the blend is a copolymer composed of ethylene and norbornene.

2. A multilayered polymeric laminate having a layer which includes the film of claim 1.

3. The polymer blend according to claim 1, wherein the polyethylene is selected from the group consisting of mLLDPE, and combinations of mLLDPE and LLDPE.

4. The film according to claim 1, wherein the LLDPE is present in amounts of from 2 to 8% by weight, based on the weight of the polymer blend.

5. The film according to claim 1, wherein the LLDPE is present in amounts of from 2.5 to 5% by weight, based on the weight of the polymer blend.

6. The film according to claim 1, wherein the LLDPE includes mLLDPE.

7. The film according to claim 1, wherein the COC resin has a glass transition temperature of from 60° C. to 190° C.

8. The film according to claim 1, wherein the COC resin has a glass transition temperature of from 60° C. to 145° C.

9. The film according to claim 1, wherein the reduction in the number of optical defects in the film is at least 80%, as compared by way of an optical measurement system comparing a film made from the same COC resin composition, but having no LLDPE blended therewith.

10. The film according to claim 1, wherein the reduction in the number of optical defects in the film is at least 90%, as compared by way of an optical measurement system comparing a film made from the same COC resin composition, but having no LLDPE blended therewith.

* * * * *